Jan. 15, 1929.
C. F. PASAL
TABLE UTENSIL
Original Filed Nov. 19, 1923
1,699,248
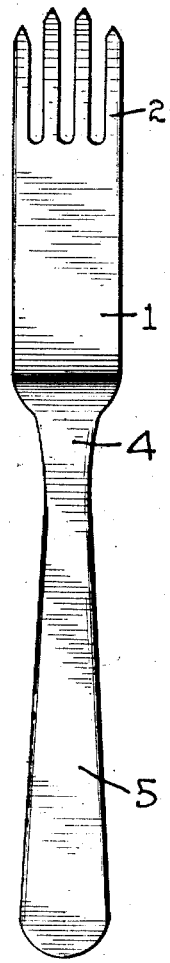
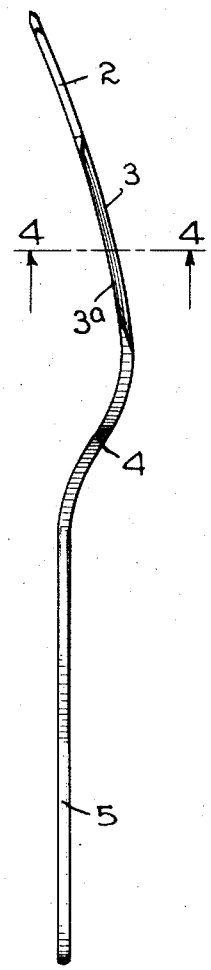
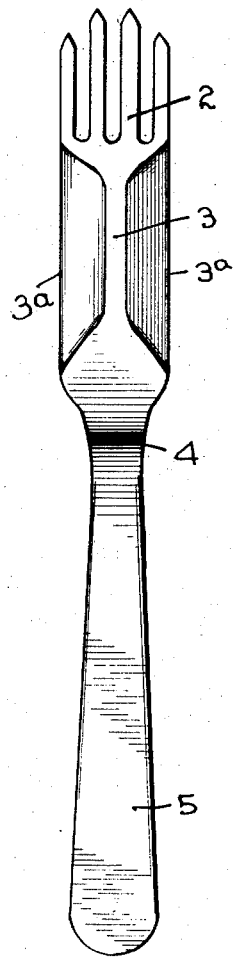
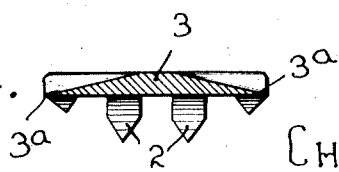
Inventor
CHARLES F. PASAL.
By Titean H. Johnson
Attorney Patented Jan. 15, 1929.

1,699,248

UNITED STATES PATENT OFFICE.

CHARLES F. PASAL, OF CHICAGO, ILLINOIS.

TABLE UTENSIL.

Application filed November 19, 1923, Serial No. 675,746. Renewed August 23, 1928.

This invention relates to table forks.

It has for its object to provide a fork which, while capable of performing conveniently and expeditiously all the functions of an ordinary fork, may be used with convenience as a cutting implement, thereby rendering the implement especially adapted for use as a salad fork, wherewith to eat, and wherewith to cut without shifting the fork to the opposite hand, and without the aid of a separate knife. Also it will be observed that the implement is especially useful to persons having but one hand.

A further object of the invention is to provide a fork that will be strong and durable, especially in those parts that have to stand considerable strain in use.

The accompanying drawings illustrate one practical form embodying the invention, and which I will describe in detail to enable others to understand and use the same; but I do not consider the invention restricted to the specific construction shown in the drawings, and therefore refer to the claims for summaries of the essentials of the invention and the novel features of construction for which protection is desired.

In the drawings:

Fig. 1 is a top plan view of a fork embodying the invention.

Fig. 2 is a bottom plan view thereof.

Fig. 3 is an edge view or side elevation.

Fig. 4 is a transverse section on the line 4—4 of Fig. 3.

As shown in the drawings, I provide a fork having a body portion 1 with the tines 2 formed at the end thereof, a curved shank 4 and a substantially straight handle 5. The tines 2 are formed in the usual manner, and extending therefrom to a point adjacent the curved shank is provided a strengthening rib 3 for a purpose hereinafter more fully described. The tines 2 are of the usual construction, and are of substantially the same length as is customary in forks.

After the average fork has been in use for some time, it becomes weakened and has a tendency to become bent at some point adjacent the shank thereof below the tines. To overcome this weakness my novel fork is provided with the aforementioned strengthening rib 3. This rib extends from a point directly below the tines of the fork disappearing into the shank thereof, thus forming a substantial construction which will not become weakened after use.

The body 1 of the fork is tapered away on each side of the rib 3, as shown at $3^a$, and is substantially as sharp as the edge of a knife, and these edges are adapted for use in the cutting of articles of food. In the eating of a salad for example, if a piece of fruit or vegetable is found too large to be eaten conveniently, instead of transferring the fork to the other hand and then taking a knife, cutting the food, and then taking the fork again, the implement is retained in the hand in which it was originally grasped. In the use of my improved fork, by merely placing the cutting edge $3^a$ against the food and pressing slightly on the food, all necessity for the use of either the other hand or any other implement is obviated.

What I claim is:

A food implement of the character described having a handle and a body portion, said body portion having an elongated form and provided with short tines at its end, a flattened re-enforcing strip extending longitudinally of the body portion at the back thereof, and widening into the handle at one end, to strengthen the handle at the point where it joins the body, and widening to the opposite edges of the body at the tine end, to strengthen the implement adjacent the tines; said body portion being beveled from said strip laterally to the sides between the widening portions of the rib, to provide sharp cutting edges, the body portion constituting a plane surface throughout, upon the upper surface of the implement between the handle and the tine portion.

In testimony whereof I affix my signature.

CHARLES F. PASAL.